Sept. 15, 1959    G. S. KNOX    2,904,357
ROTATABLE WELL PRESSURE SEAL
Filed March 10, 1958    8 Sheets-Sheet 1

GRANVILLE S. KNOX
INVENTOR.

BY
ATTORNEY

Sept. 15, 1959

G. S. KNOX 2,904,357

ROTATABLE WELL PRESSURE SEAL

Filed March 10, 1958

GRANVILLE S. KNOX
INVENTOR.

BY

ATTORNEY

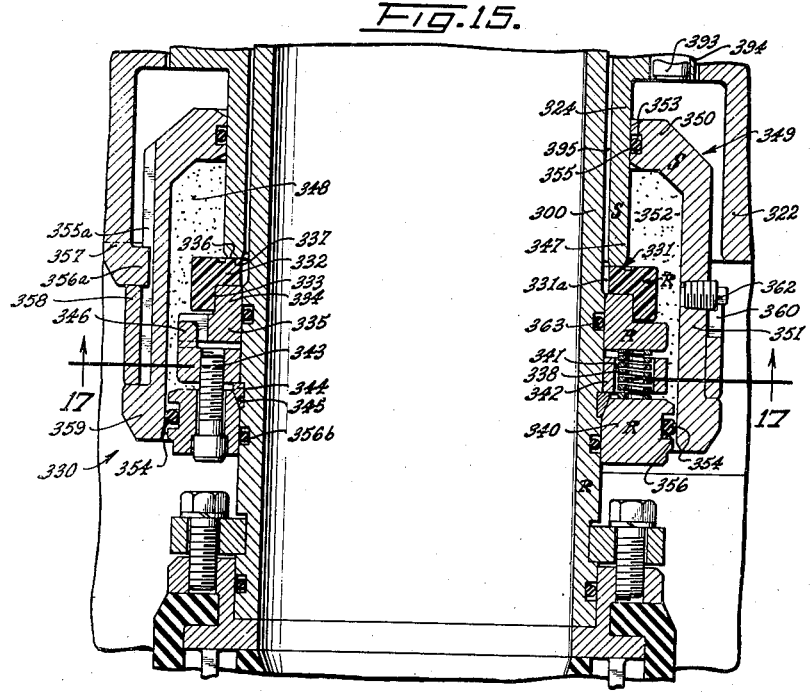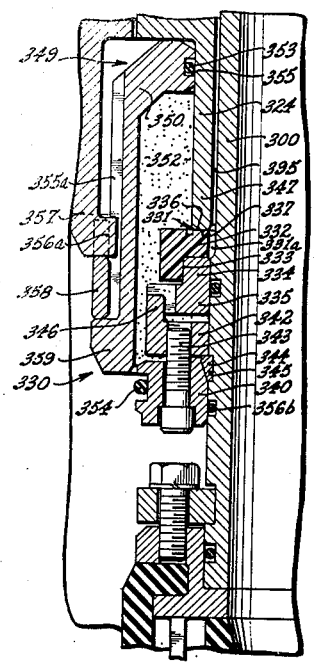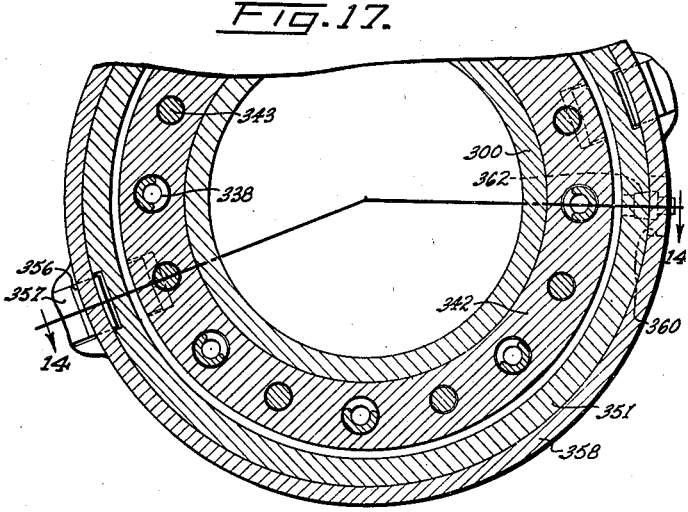

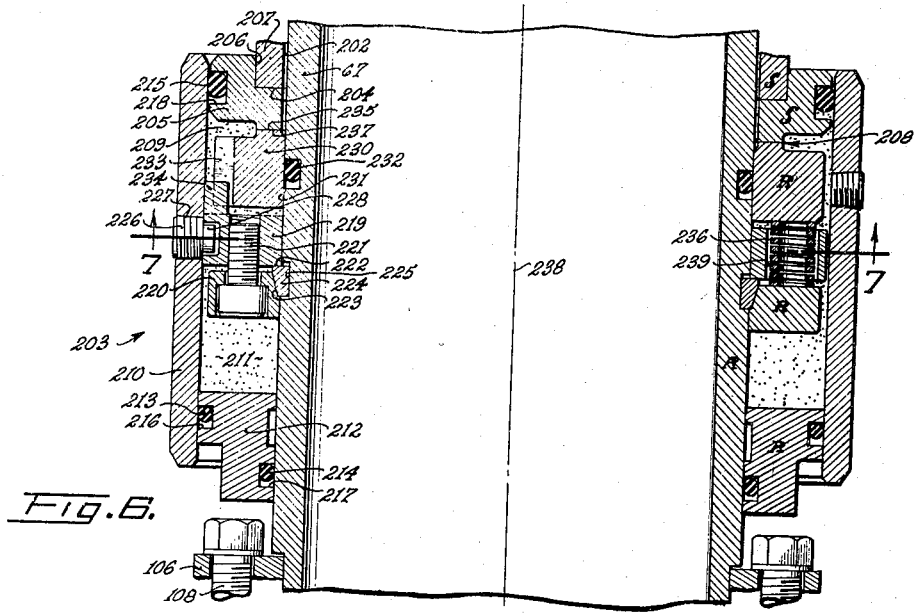
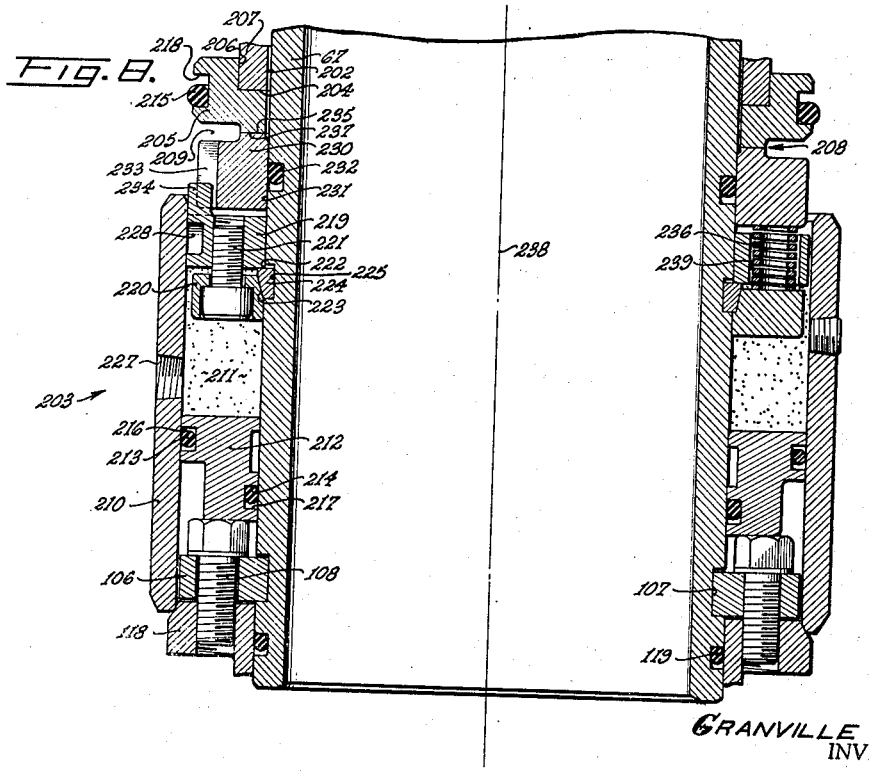

Sept. 15, 1959 G. S. KNOX 2,904,357
ROTATABLE WELL PRESSURE SEAL
Filed March 10, 1958 8 Sheets-Sheet 5
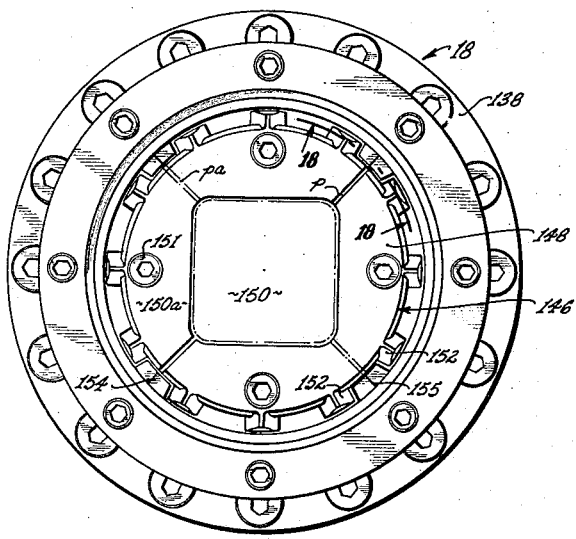
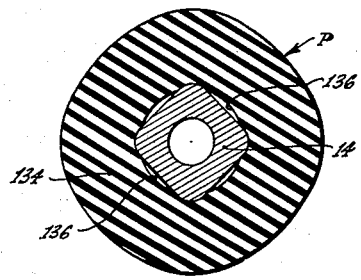
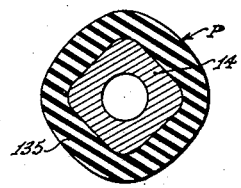
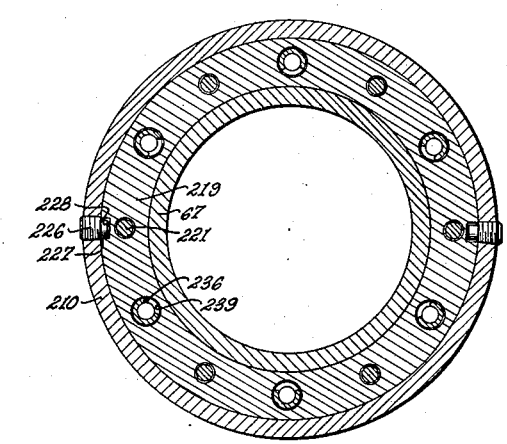
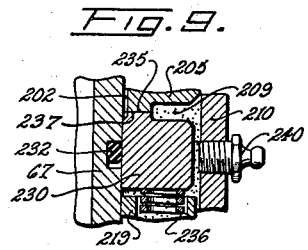
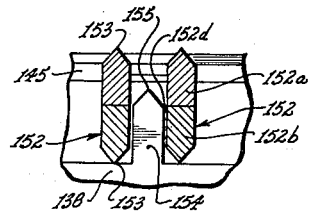
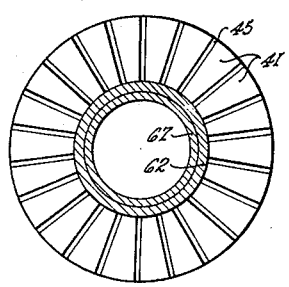
GRANVILLE S. KNOX
INVENTOR.
BY
ATTORNEY

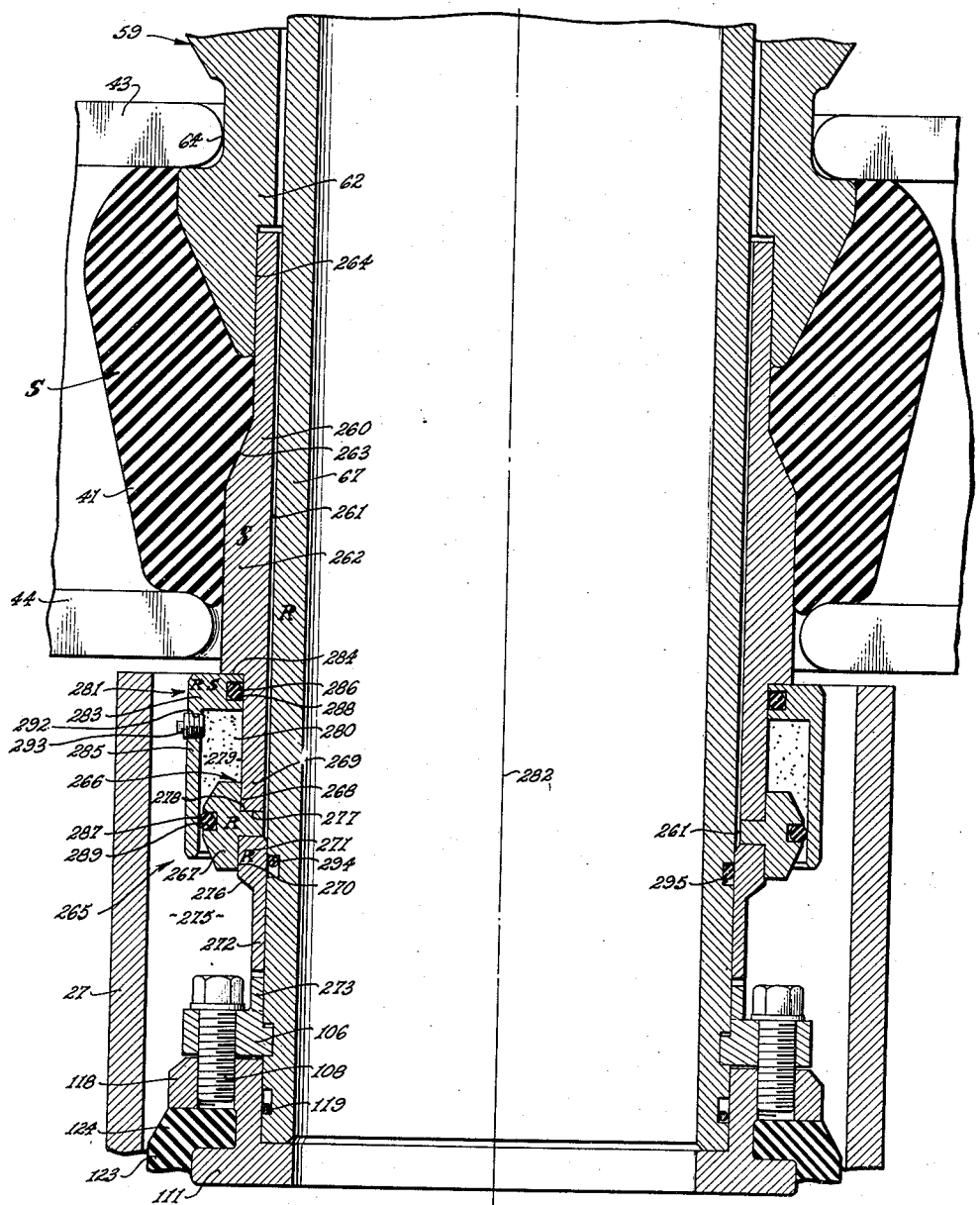
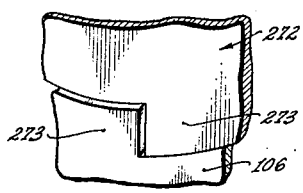

GRANVILLE S. KNOX
INVENTOR
ATTORNEY

Sept. 15, 1959  G. S. KNOX  2,904,357
ROTATABLE WELL PRESSURE SEAL
Filed March 10, 1958  8 Sheets-Sheet 8

GRANVILLE S. KNOX
INVENTOR.

BY
ATTORNEY

United States Patent Office

2,904,357
Patented Sept. 15, 1959

---

2,904,357

ROTATABLE WELL PRESSURE SEAL

Granville S. Knox, Glendale, Calif., assignor to Hydril Company, Los Angeles, Calif., a corporation of Ohio Application March 10, 1958, Serial No. 720,396

36 Claims. (Cl. 286—16.1)

This invention relates generally to apparatus for sealing off clearances between relatively rotatable parts especially coaxial inner and outer tubes used in oil well drilling operations. More particularly, the invention is directed to a solution of the problem of abrasive wearing away of pressurally interengaged relatively rotatable surfaces sealing off against pressures of abrasive well fluid as high as 2,000 pounds per square inch.

Keeping in mind that the above problem is encountered in many different types of oil tool equipment wherein bearing surfaces are relied upon to seal off against abrasive well fluid, and that the invention will therefore often be applicable to many types of such equipment, the present discussion will be limited, for purposes of description, to a particular application of the invention involving the use of what are known as Kelly packers.

As described in U.S. Patent 2,731,281 to Granville S. Knox, issued January 17, 1956, a Kelly packer is a device having an elastomeric sealing element, or stripper packer, operable to pack off the rotating kelly during drilling operations, that is, when the drill stem with its enlarged collars is being rotated and simultaneously moved longitudinally through the well casing. Since the rotating kelly is of polygonal cross-section, the stripper packer together with a vertical tube supporting the packer are generally allowed to rotate with the vertical kelly. The supporting tube is in turn bearing supported within a non-rotating housing, and it is necessary to seal off between the rotating support tube and the stationary housing so as to prevent escape of pressurized well fluid flowing upwardly into the housing from within the well head casing to which the housing is attachable.

As disclosed in the Knox patent referred to, one way of sealing off between the support tube and casing is to surround the tube with one or more split fiber rings in the nature of piston rings which may be pressed inwardly to seal against the rotating tube by radial inward constriction of an annular elastomer packer, to which fluid pressure is usually transmitted for energizing and constricting the packer. However, the fiber-to-metal seal established between the split rings and rotary tube is subject to abrasive wear by pressurized well fluid such as drilling mud entering between the relatively sliding rings and tube surfaces, requiring the shutting down of the equipment and replacement of the rings at periodic intervals which under severe conditions can be as short as a few hours.

As mentioned in the opening paragraphs, it is a primary object of the invention to provide a satisfactory solution to the above described problem of abrasive wear through the provision of means not only sealing off between the rotary stripper-packer support tube and packer housing, and more generally, between inner and outer oil tool tubes used for example in drilling operations, but also operable to shut off access of abrasive well fluid to interengaged seal forming bearing surfaces. Accordingly, the invention broadly contemplates the provision of a rotatable well pressure seal embodied in the combination of relatively rotary members generally including a rotary inner member and a non-rotary outer tubular member coaxial with and surrounding the rotary inner member which may also be tubular, with clearance therebetween.

The clearance may be either axial or radial and may be of any degree sufficient to permit free relative rotation between the parts. It is important, however, that there be a zone of clearance or a clearance terminus that is sufficiently restricted to form a seal for retaining a viscous liquid or semi-solid barrier material introduced outside the clearance terminus at the well pressure end of the clearance. An annular closure means is provided for bridging the clearance terminus in pressure sealing engagement with both tubular members at locations spaced from the terminus. The closure means is such as to form with one or both tubes a confined space outside the clearance terminus for receiving the barrier liquid, which may for example be a viscous grease, the closure means including a bearing, for example a thrust bearing, in pressure sealing engagement with the tubular members blocking egress of grease from the confined grease space to the clearance. By "space outside the clearance terminus" is meant broadly a space at the high pressure side of the clearance terminus or entrance as distinguished from the exit or low pressure side thereof. The closure also includes a piston exposed to the interior and exterior of the grease space for transmitting well fluid pressure to the grease thereby equally pressurizing the latter so that there is almost no tendency for the abrasive well fluid to enter the grease space. Thus, access of abrasive well fluid to the clearance remains effectively blocked first by the equally pressurized grease and secondly by the thrust bearing to which the abrasive well fluid cannot gain access for wearing away the interengaged and relatively rotatable surfaces on the tubular means and bearing, the grease always lubricating those surfaces so that their useful life is greatly prolonged. The loss of grease escaping over a period of time between those interengaged surfaces and into the clearance is compensated by movement of the piston inwardly into the confined grease space so that grease pressure remains equalized in relation to external well fluid pressure, preventing entrance of that abrasive fluid into the grease.

More subtle design considerations especially of the closure means are predicated on the effective carrying into practice of the principle that when the clearance between two relatively rotatable parts is to be sealed off, there should be no appreciable differential fluid pressure across the seal where at least one of the fluids is abrasive in nature; for otherwise the seal will rub against abrasive material entering between the seal and one metal part with respect to which the seal is rotatable causing rapid deterioration of the seal. Thus, as an application of this principle, the design of the closure means represents first of all a recognition of the fact that what is being closed off is the clearance between a pair of relatively rotatable cylindrical parts, meaning that at least two relatively rotatable cylindrical and/or closure parts will have to be sealed off, and secondly that a pressure differential will exist as between pressure in the sealed off clearance and pressure of the abrasive well fluid. The problem then becomes one of eliminating or neutralizing the pressure differential insofar as the pressure of the abrasive well fluid is concerned, the barrier liquid and a piston exposed on one side to pressure of the abrasive fluid and on the other side to the barrier liquid for equally pressurizing that liquid being provided for this purpose. With elimination of the pressure differential between the barrier liquid and abrasive fluid at opposite sides of clearances between relatively rotatable tubular or closure parts, it is then acceptable to utilize rubber seals at the clearances for sealing off entrance of abrasive fluid into the barrier liquid.

These and other features and objects of the invention, as well as the details of an illustrative embodiment, will be more fully understood from the following detailed description of the drawings, in which:

Fig. 4 is a top plan view of Fig. 3;

Fig. 5 is a section on line 5—5 of Fig. 3;

Fig. 6 is an enlarged vertical section through the two-stage well pressure seal shown in Fig. 3;

Fig. 7 is a section taken on line 7—7 of Fig. 6;

Fig. 8 is a view similar to Fig. 6 showing the manner in which access is gained to components of the rotatable seal;

Fig. 9 is a fragmentary vertical section through a part of the rotatable seal shown in Fig. 6, and illustrating the means for introducing barrier liquid into the seal space;

Fig. 10 is an enlarged section taken through the thick wall of the stripper packer and kelly received therethrough;

Fig. 11 is an enlarged section taken through the lower, reduced thickness wall of the stripper packer and kelly received therethrough, the packer being collapsed about the kelly by well pressure;

Fig. 12 is a vertical elevation, partly in section, illustrating a modified form of the rotatable well pressure seal;

Fig. 13 is a fragmentary perspective view of rotary interlocked elements of Fig. 12;

Fig. 15 is an enlarged vertical section through the rotatable well pressure seal shown in Fig. 14;

Fig. 16 is a view similar to Fig. 15 showing the manner in which access is gained to components of the rotatable seal of Fig. 14;

Fig. 17 is a fragmentary section taken on line 17—17 of Fig. 15;

Fig. 18 is a fragmentary section taken on line 18—18 of Fig. 4;

Figure 2:
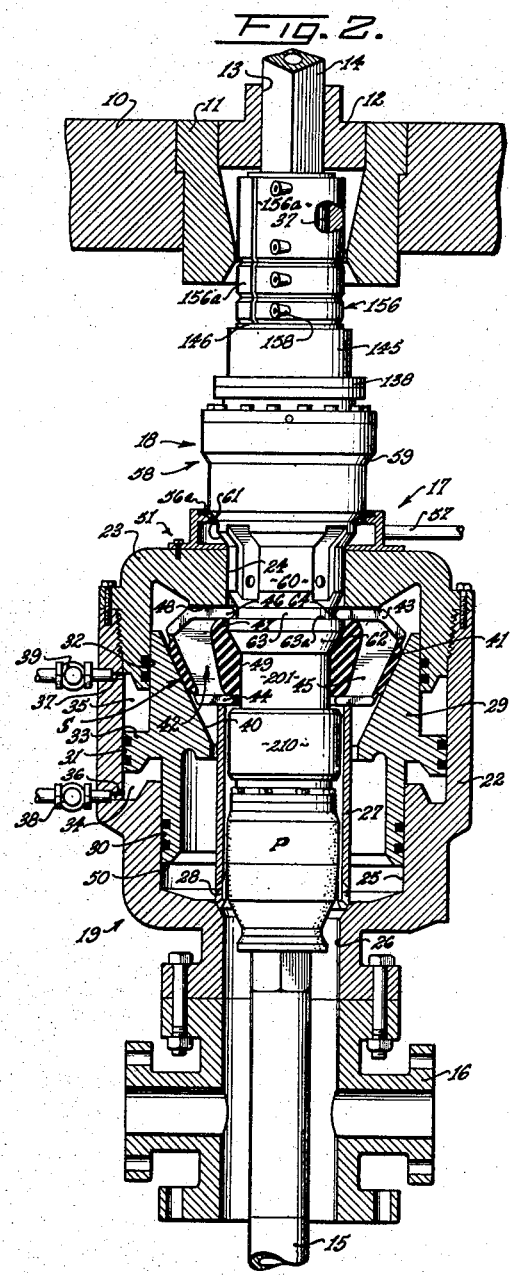
Fig. 2 is an elevation, partly in section, showing the Kelly packer and housing assembly below a rotary table, and receiving a drive kelly.

In Fig. 2 there is illustrated a conventional rotary table 10 adapted to drivingly receive a central, non-circular and split master or table bushing 11 which, in turn, drivingly accommodates a usual, non-circular Kelly drive bushing 12. The Kelly bushing has a non-circular, axial opening 13 to take the non-circular kelly 14 which is coupled to drill string 15 in the usual manner. The kelly and Kelly bushing are relatively axially slidable, and rotative drive from the table to the Kelly is imparted through the interfitting master and table bushings. I have here illustrated the kelly and the mating opening of the Kelly bushing as being of square cross section, but it is obvious that they may have other polygonal shapes.

The drill stem is entered in a usual well casing (not shown) to the upper end of which is coupled any suitable flow-fitting 16.

The assembly 17 comprising my improved Kelly packer and blowout preventer, is made up, in the main, of two cooperating units 18 and 19, unit 18 including a Kelly stripper packing P, and unit 19 including sealing means S for sealing off unit 18 from an outer housing or body member 22 coupled to fitting 16 or to any other suitable fitting which may comprise the upper terminal of the well casing.

Unit 19 may, in itself, comprise a blowout preventer effective normally to function as such on drill pipe or on open hole when unit 18 is not being used, though this is not at all limitative on the broader aspects of my invention. For illustrative purposes I have shown, as a blowout preventer particularly well adapted to the present purpose, the device fully described and claimed in my Patent No. 2,609,836, issued September 9, 1952.

Cap member 23 of housing or body member 22, has a central bore 24 which opens to cylinder bore 25, the lower end of the bore opening to flow passage 26. A standpipe 27 is welded at its lower end to the housing and extends upwardly in bore 25. The lower end of pipe 27 has flow-passage notches 28. Annularly spaced from pipe 27 is a packer actuator 29 having piston fit at 30, 31 and 32 (Fig. 3) with the opposing defining walls of bore 25. The piston head 33 divides a portion of bore 25 into chambers 34 and 35, said chambers being provided with flow passages 36 and 37, respectively, controlled by valves 38 and 39, respectively, whereby fluid under pressure may be selectively admitted to or exhausted from said chambers to cause controlled reciprocation of member 29 or to hold that member in adjusted position.

Actuator 29 has a downwardly converging, conical bore 40 within which is positioned the complementary, conical sealing member generally indicated at S. This member comprises a massive annulus 41 of natural or synthetic rubber or some other suitable resilient plastic. Neoprene having a durometer hardness of 65 to 70, has been found to be a suitable substance. Molded within the annulus are circumferentially spaced, metal inserts 42 which comprise upper and lower plates or flanges 43 and 44, respectively, connected by vertical webs 45. It will be noted that the inner ends 46 of top plates or flanges 43 project radially inward beyond the immediately underlying portion 47 of annulus 41. The member S is held against vertical displacement by the engagement of insert flanges 43 and 44 with the underside 48 of cap 23 and the upper end of standpipe 27, respectively.

Figure 1:
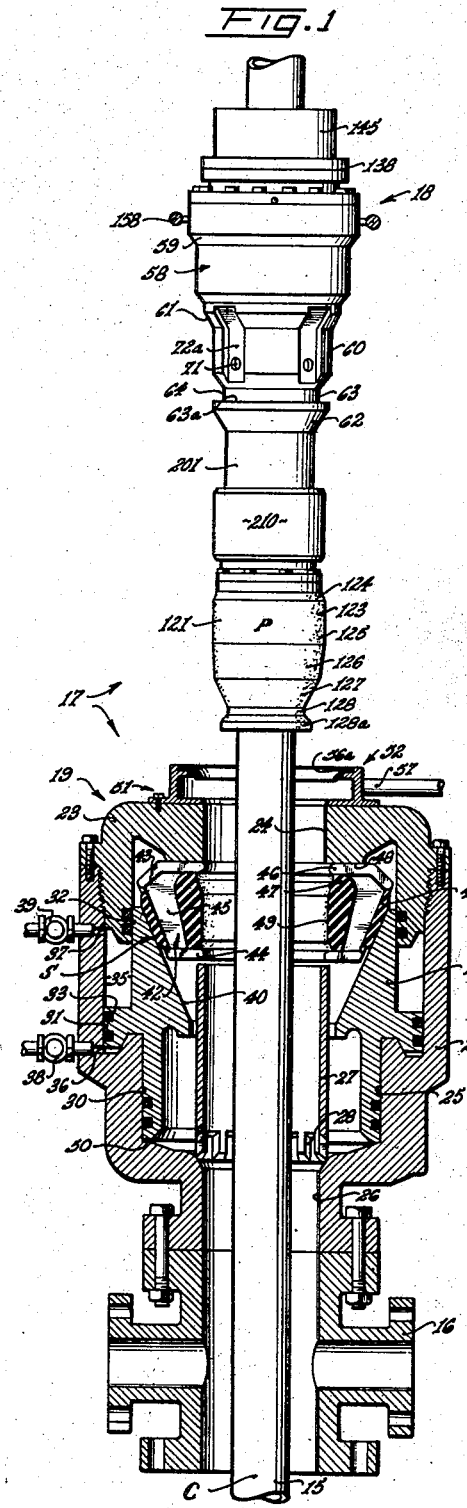
Fig. 1 is an elevation, partly in section showing the assembly or disassembly of oil tool equipment including a Kelly packer outside a sectioned housing therefor, and a drill string extending vertically through the packer and housing.

When actuator 29 is down in the position of Fig. 1, the annulus 41 is inherently radially expanded to an extent which opens the major bore 49 of the annulus and the bore defined by flange ends 46 to an extent approximately equal to the diameter of cap-bore 24. It will be seen that by admitting fluid under pressure to chamber 34 and relieving the pressure in chamber 35, actuator 29 is forced upwardly from the position of Fig. 1 and will radially constrict member S and thus reduce the diameter of its effective bore. The inserts 42, with their webs 45 and flanges 43, 44, control the flow of the plastic 41 and prevent harmful axial extrusion thereof, all as explained in detail in Patent No. 2,609,836. As soon as the annulus closes about work of any nature, well pressure below member 29 is effective against piston area 50 to aid in further radially constricting the plastic annulus.

On the other hand, when fluid pressure is relieved from chamber 34 and applied in chamber 35 (assuming the actuator 29 is up in the position of Fig. 3) the piston is forced downwardly, and the resiliency of the annulus 41 restores said annulus to the radially expanded condition of Fig. 1.

Bolted at 51 to the upper face of housing cap 23, is an annular drain tray 52 whose bore 53 registers with cap-bore 24, and which tray has a conical positioning shoulder 54, whose purpose will presently be described.

An annular cover ring 55 is bolted to the upper edge of the tray-flange 56 and clamped therebetween is a flexible wiper seal 56a made, for instance of molded "Hycar." The drain tray has a drainage outlet pipe 57.

Figure 3:
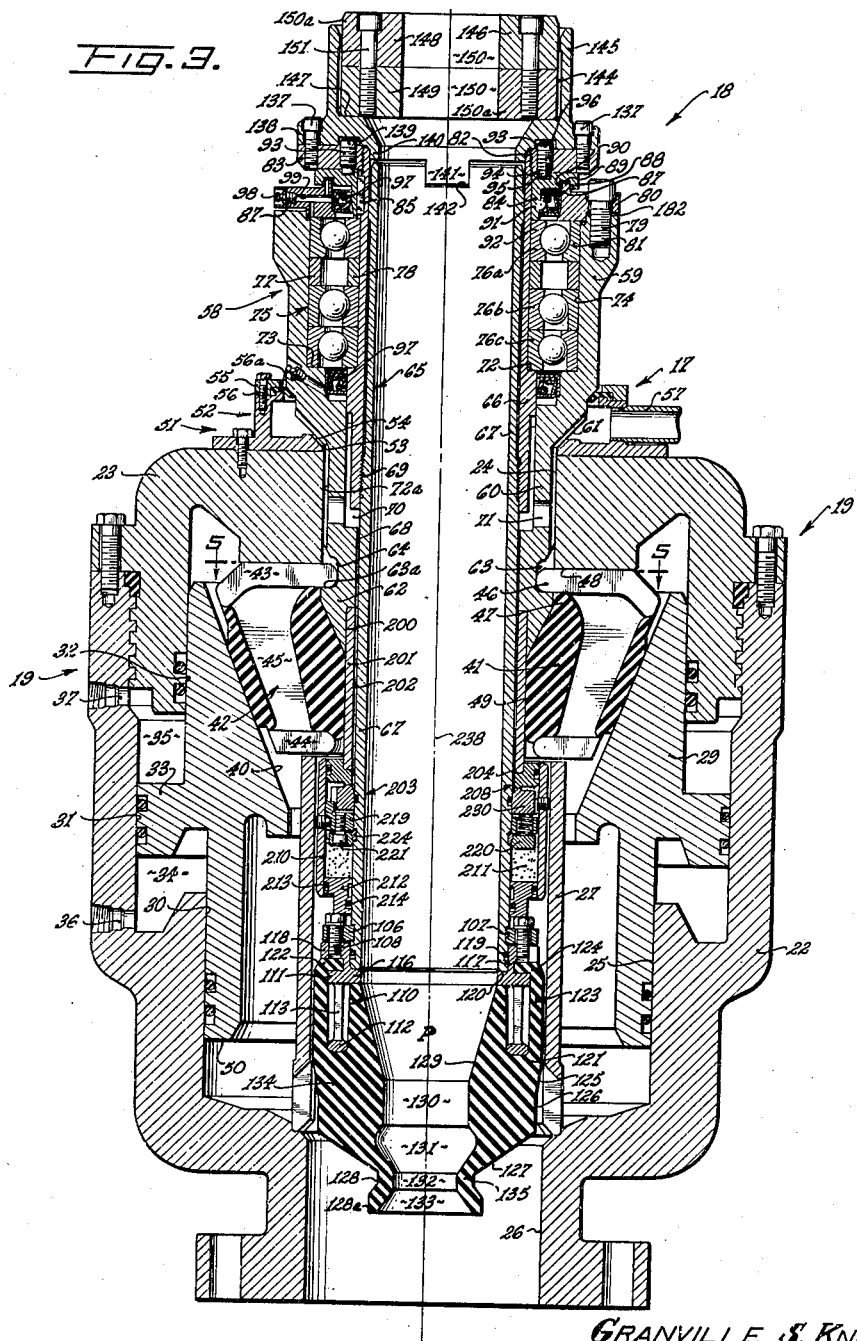
Fig. 3 is an enlarged vertical section through the stripper packer and housing assembly, with the drive kelly removed and the blowout preventer energized, and illustrating one form of rotatable well pressure seal.

The Kelly packer unit 18 is actually assembled about kelly 14 (or some other element of the drill string) and then lowered into unit 19, but it will be more easily described by first assuming it is in the position of Fig. 3, in which figure the kelly is omitted in order to expose the full structure of the unit. Actually, the kelly occupies the bore of unit 18 when that unit is in the position of Fig. 3 and the packing member P will be deformed by the kelly to take approximately the shape shown in Fig. 10.

The housing 58 of Kelly packer unit 18 includes a tubular body portion 59 and a relatively reduced, elongated and tubular neck portion 60, the junction between the two portions being formed as a conical portion 61 which is adapted to seat on the conical positioning shoulder 54 when the unit 18 is lowered to the position of Fig. 3.

When in this position, wiper seal 56a, engages the outer surface of housing 58. The neck portion 60 fits the cap-bore 24 with working clearance and its lower end 62 extends below cap 23 and, in this extended end, there is provided an annular groove 63 which, when positioning shoulders 54 and 61 are in engagement, lines up horizontally with insert-ends 46. The unit 18 is lowered into unit 19 when the latter is in the condition of Fig. 1, neck 60 thus being passable, with annular clearance, through the bore of the ring formed by insert flanges 43. Then, when member S is radially constricted by raising actuator 29, as has been described, flange ends 46 enter groove 63 so as to overlie the square-cut, upwardly facing shoulder 63a defining the lower side of the groove and to pressurally engage the groove-bottom 64, thus releasably holding unit 18 against upward dislodgement from and rotation with relation to the unit 19. Continued elevation of actuator 29 causes the plastic material of annulus 41 to flow around the now stationary inserts 42 and to sealingly engage another element of unit 18, as will be described later. Thus, flange ends 46, or more broadly, member S, form a releasable latch for holding units 18 and 19 in assembly, the "latch," thus formed, being controllable by actuation of member 29. Ends 46 may be considered as latching fingers.

A composite tube 65 is rotatably supported within and by body member 59, this tube being made up of a bearing sleeve 66 and a stripper sleeve 67, the two sleeves being telescoped throughout the extent of sleeve 66, while the lower end of sleeve 67 projects downwardly below sleeve 66, and extends, with running fit, through the bore 68 of neck 60. The two sleeves are threadably connected at 69. The lower end of bearing sleeve 66 extends with annular clearance, into the counterbore 70 of neck 60, said counterbore communicating through ports 71 with drainage channels 72a sunk in the external face of neck 60 and opening at their upper ends to drainage tray 52.

Bearing sleeve 66 has an upwardly facing, annular shoulder 72 which is flush with the bottom wall 73 of housing counterbore 74. Within this counterbore and bottomed on shoulder 72 and wall 73, is a stack 75 of "radio-thrust bearings" preferably, though not necessarily three in number, and individually designated at 76a, 76b and 76c. This type of bearing not only serves well as a rotational bearing but also has exceptionally high rating as an end thrust bearing. The bearings 76a and 76b are axially separated from one another by outer and inner spacer rings 77 and 78, respectively. Bolted at 79 to the upper end of housing 18 is a bearing ring-cap 80 which engages the outer race 81 of bearing 76a, there being vertical clearance 182 between the cap and housing, so by tightening bolts 79, the outer races of all the bearings are rigidly clamped between the cap and housing shoulder 73.

Screwed at 82 on the upper end of sleeve 66 is a drive ring 83, and between this ring and bearing 76a is a bearing adjusting collar 84. This collar is keyed at 85 and has a groove to take upstanding flange 87 on ring cap 80. The flange and groove have running fits at 88, but vertical and annular clearances 89 and 90, respectively, are provided so ring 80 and collar 84 may be capable of relative vertical movement during the adjustment of the bearing 75, as will be described.

Adjusting collar 84 has a depending annular flange 91 engaging the inner race 92 of bearing 76a, and threaded through drive ring 83 are adjustment bolts 93 whose lower, unthreaded ends 94 are entered in sockets 95 provided in adjusting collar 84. By threading the bolts downwardly, adjusting collar 84 is depressed in a manner to clamp the assembly of ring 78 and the inner races of bearings 76a, 76b and 76c in longitudinal compression. When the clamping compression is of the proper degree, a wire 96 is run through the heads of bolts 93 to releasably lock them, and therefore collar 84 and the bearing elements in adjusted positions.

Preferably a grease seal-off ring-assembly 97 is provided between the relatively rotatable adjusting collar 84 and ring 80.

It will be seen that due to the described connection of parts, drive ring 83 acts as a head for composite tube 65, and that this head, in effect, suspends said tube and all parts carried thereby from the bearing stack 75, thus efficiently mounting the tube for rotation with respect to housing 58. Bearings 76a, 76b and 76c are matched, precision, radio-thrust ball bearings, and the two lower bearings 76b and 76c are mounted in tandem so they equally share the load imposed by the upward thrust of well pressure against rotating tube 65. Upper bearing 76a resists the comparatively small downward load imposed in passing tool joints down through packer P. The bearings are preferably pre-packed with grease. Grease-gun fittings 98 which are in communication with passageways 99 provide means for introducing sealing-grease to the ends of the bearing assembly.

It will be seen that drive ring 83, adjusting collar 84, bearing sleeve 66, and stripper sleeve 67 are adapted to rotate as one when rotative force is applied to drive ring 83.

Upwardly tightly received in a counterbore 200 in the lower end 62 of body 59 is a sleeve 201 coaxial with stripper sleeve 67 that is rotatable relative to sleeve 201, running clearance between the two sleeves being indicated at 202, as better seen in Figs. 6 and 8. When sealing member S is constricted in the manner previously described, it sealingly engages sleeve 201 establishing a horizontal sealing barrier extending from the housing wall 22 through actuator 29 to sleeve 201, and well fluid under pressure within flow passage 26 will be unable, if the seal is sufficiently tight, to pass upwardly through housing 22 around the outside of sleeve 201. However, the radial constriction of packer S will not prevent rotation of stripper sleeve 67 because of the running clearance 202 between sleeves 67 and 201.

The closure means generally indicated at 203 for sealing off entrance of well fluid into the clearance 202 will now be described, it being first pointed out that the lower end of sleeve 201 terminates alongside inner tube 67 at 204. Those parts of the closure means that are rotatable and non-rotatable about central axis 238 are respectively labeled "R" and "S" in Fig. 6. The closure means includes an annular thrust bearing 205, typically made of bronze or other suitable bearing material, having a counterbore 206 tightly receiving the terminal lower end 207 of outer sleeve 201 to prevent leakage of fluid therebetween. Thus, the bearing is rigidly mounted on the sleeve 201, and blocks access to opening 204 between the sleeve and bearing, with a downward continuation of the clearance between the bearing and inner sleeve 67 ending at a terminus or zone of restricted clearance generally indicated at 208.

Bridging the thrust bearing and forming therewith confined annular space 209 outside terminus 208 is an annular sleeve 210 coaxial with bearing 205 and sleeves 67 and 201. Filling space 209 is a barrier liquid 211, typically a heavy, viscous grease, that is pressurized by means of the annular piston 212 received between rotatable sleeves 210 and 67, the piston being free to float vertically and axially, and being exposed to the interior and exterior of grease space 209 for transmitting exterior fluid pressure to the grease, thereby equally pressurizing the latter and eliminating the tendency for well fluid to enter space 209. Thus, well fluid pressure exerted against the exposed under side of piston 212 tends to force the piston upwardly into space 209. Rubber O-rings 213, 214 and 215 received in grooves 216, 217 and 218 in the piston and thrust bearing as shown, respectively seal off between the piston 212 and sleeve 210, the piston and sleeve 67 and the thrust bearing 205 and sleeve 210, and since the pressure both inside and outside space 209 is equalized, the rubber O-rings and particularly ring 215 are not subjected to pressure differentials that would otherwise force abrasive well fluid between rubbing rubber and metal interfaces.

Sleeve 210 is constrained to rotate with inner sleeve 67 by virtue of means interlocking the two sleeves, including upper and lower coaxial rings 219 and 220 respectively clamped by circularly arranged bolts 221 against the horizontal upper and tapered lower annular surfaces 222 and 223 of split mounting ring 224 received in a groove 225 cut in sleeve 67. Clamping pressure contracts ring 224 to frictionally engage and lock to the tube 67, and also locks rings 219 and 220 to the split ring 224. Drive from tube 67 is thus transmitted to the upper ring 219 which is coupled to the outer sleeve 210 by a fitting 226 threaded into the sleeve at 227 and projecting into the upper ring at 228. Fitting 226 may be backed out of locking relation with upper ring 219 to permit downward retraction of outer sleeve 210, as seen in Fig. 8, thereby to expose the thrust bearing 205 and particularly O-ring 215, at inspection intervals when the assembly 18 has been withdrawn from unit 19 as seen in Fig. 1. If any deterioration of that O-ring is indicated, replacement thereof is readily facilitated by radial stretching of the old O-ring to permit its axial downward removal about the outer sleeve 210, and reverse installation of a new O-ring without disturbing the remainder of the assembly.

The closure means also includes an axially floating bearing annulus 230 which at 231 closely surrounds the inner tube 67 within grease space 209, an elastomeric O-ring 232 sealing off between annulus 230 and tube 67 to prevent escape of grease therebetween into the clearance 202. The annulus is constrained to rotate with tube 67 by virtue of a splined interlock at 233 between the annulus and a boss 234 on ring 219. An upper annular shoulder 235 of the annulus is thrust upwardly by springs 236 into pressural engagement with lower shoulder 237 of thrust bearing 205, thereby to seal off against entrance of pressurized grease between shoulders 235 and 237 into the clearance 202. The springs 236 are circularly arranged about the central axis 238 of the sleeves, piston, rings and bearing, and are held in compression between ring 220 and annulus 230 for exerting the necessary upward thrust, circular openings 239 through ring 219 receiving the springs therethrough, as better seen in Fig. 7.

Slow lubricating leakage of grease through the restricted clearance terminus between the interengaged thrust surfaces 235 and 237 and into clearance 202 is automatically compensated by upward bodily travel of piston 212 into space 209, under the external pressure of well fluid, whereby the grease 211 remains pressurized at all times to prevent entrance of the abrasive well fluid into space 209. Since the bulk of space 209 is located between ring 220 and the piston, piston travel upward into space 209 will not be interrupted until the great bulk of the grease has slowly escaped into the clearance 202. Thus, the seal need be repacked only at extended periodic intervals. One method of so repacking the space 209 is seen in Fig. 9, wherein a standard grease fitting 240 is shown threaded into sleeve 210 opposite the annulus 230 for discharging grease supplied to the fitting directly into confined space 209.

Downward displacement of piston 212 below the lower terminal end of sleeve 210 is prevented by its engagement with the heads of bolts 108 engaging the two-part or diametrically split mounting ring 106. The two halves of ring 106 are entered in the annular groove 107 provided near the end of sleeve 67, after the removable stripping packer P is mounted on the sleeve. The ring halves are then bolted at 108 to the packer, said assembly thereafter holding the ring halves against separation and the ring, in turn, suspending the packer from sleeve 67.

Packer P includes a rigid metal armature generally indicated at 110 which is made up of rings 111 and 112 held in vertically spaced relation by integral bars 113. These bars are circumferentially spaced apart and may be considered, together, as making up an open-work cage.

Upper ring 111 has an internal horizontal flange portion 116, a vertical flange portion 117, and, at the top of vertical flange 117, an external horizontal flange 118. Flange 118 fits nicely around sleeve 67, and preferably, there is an O-ring seal 119 between the opposed peripheral faces of the flange and sleeve.

Flange 118 takes bolts 108, and, when these bolts are tightened up, flange 116 is brought into tight contact with the lower end face 120 of sleeve 67.

Armature 110 is preferably molded into the packer-proper 121, this packer being in the form of a sleeve of resilient plastic material such as natural or synthetic rubber and preferably has a durometer hardness of from 65 to 70. The upper end 122 of sleeve 121 is molded over the top of armature flange 111. Externally, the sleeve 121 has a cylindrical portion 123, a short, upwardly and inwardly tapered portion 124 above the cylindrical portion, a downwardly and inwardly tapering portion 125 just below the cylindrical portion, a cylindrical portion 126, a more sharply tapered portion 127, a lower cylindrical portion 128, and an outwardly flared terminal portion 128a.

Internally, sleeve 121 has a downwardly converging tapered bore 129 leading to a cylindrical bore 130 which is vertically spaced by the concavity 131 from the smaller diameter and shorter cylindrical bore 132. An outwardly flaring bore 133 opens to the lower, free end of the packer sleeve.

The sleeve 121 thus has relatively thick walls 134 at its central portion, and a tapered lip formation 135 near its lower end which has a tendency to flex bodily outwardly about concavity 131 when a kelly is inserted therethrough.

The described formation of the armature 110 serves to anchor the material of the upper end of packer 121 so external well pressure will not objectionably radially collapse the upper end of the packer nor cause objectionable axial flow of the packer material.

However, the circumferential spacing of bars 113, permits the limited radial "breathing" of the packer necessary to the passage of drill string enlargements through its bore.

As an example of relative sizes, I have found the following to give very satisfactory results. With a square kelly which is 3½" across the flats, the diameter of bore 130 may be 3¼", the major diameter of cavity 131 may be 4" and the diameter of bore 132 may be 2¼". When a kelly of such dimension is thrust through a packer having the given dimensions, the packer is deformed to take, approximately, the shape shown in Figs. 10 and 11. The thick-walled central portion of the packer effectively grips the kelly but will not ordinarily engage the full faces thereof, and thus small voids, such as at 136, will be left (Fig. 10). The sealing lip 135 will, however, tightly engage the kelly throughout its perimeter. Then, when the well pressure is applied to the outer face of the packer, the voids 136 disappear, and the central portion 134 of the packer, as well as lip portion 135, sealingly engage the kelly and resist the efforts of even extremely high well pressure to cause leakage between the kelly and the packer.

In this condition, provided the various elements sealing from sleeve 67 to housing 22 are in operative condition, the kelly is fully packed off with relation to the housing. When the kelly is rotated, the packer P rotates with it and therefor the non-circular cross-section characteristics of the kelly do not interfere in any way with the rotative movement. On the other hand the seals between such parts as do relatively rotate are on cylindrical surfaces, and therefore can be relatively easily accomplished. By reason of the described arrangement, the severe wearing and tearing effects which result from relatively rotating two sealingly engaged parts of which one, at least, is non-circular, are entirely eliminated.

I will now describe the means whereby the rotative drive of kelly 14 is imparted to tube 65 and hence to packer P, so said kelly and packer rotate as one. Bolted at 137 to drive ring 83 is a driving head or ring 138 which has an annular groove 139 to take, with clearance, the heads of adjustment bolts 93. The head 138 has an internal flange 140 which fits the bore of sleeve 66, the flange being vertically extended to form lugs 141 which project into notches 142 provided in the upper end of sleeve 67. The notched-and-lug engagement helps in transmitting rotary drive from head 138 to sleeve 67 and also prevents the accidental unscrewing of sleeve 67 from sleeve 66. When it is desired or necessary to replace sleeve 67, it is merely necessary to detach head 138 from ring 83, and unscrew sleeve 67 from sleeve 66, it being noted that this replacement operation does not involve any manipulation or unlocking of the bearing adjustment bolts 93. Sleeve 67 is preferably made of hardened steel and thus has long service life, but when occasion finally arises for its replacement, the replacing operation is very simple and quickly accomplished.

Driving head 138 has an enlarged counterbore 144, defined by vertical flange 145, adapted to receive the drive bushing 146 which, during certain stages of operation, bottoms on the upwardly facing shoulder 147. Bushing 146 may be of any suitable form which will transmit rotary drive from kelly 14 to head 138, but I have illustrated a preferred form which is particularly easily engageable with the kelly and with the head. The bushing is made up of upper and lower rings 148 and 149, respectively, each of which is diametrically divided so the rings may be readily assembled about the kelly. Thus each ring is made up of two half-sections 150a. The rings, which have square openings 150 to take the kelly 14 with working clearance, are arranged so the parting line p between the sections of one ring is normal to the parting line pa between the sections of the other ring (Fig. 4). It follows that when the rings are connected by bolts, the entire assembly of sections is held intact. It thus becomes possible to have vertically extending connecting bolts instead of radially or tangentially extending fastening means, thus leaving the entire outer periphery of the bushing available for driving lugs or the like.

Bushing 146 has a series of twelve circumferentially spaced, vertically extending driving lugs 152, though this number is not at all limitative. Each full lug is made up of a half-lug 152a on ring 148 which matches a half-lug 152b on ring 149, as shown in Fig. 18. The full lugs are pointed at both ends, as at 153, so the bushing may be reversed top for bottom if occasion arises.

Flange 145 is provided with four, equi-angularly spaced, vertical driving lugs 154 which are of a width to be taken between any two bushing lugs 152, and their upper ends are pointed as at 155. When bushing 146 is lowered into head 138 during a stage of the operation to be described later, lugs 154 enter between pairs of lugs 152, the pointed ends 153 and 155 acting as cams to rotate bushing 146 with relation to head 138 sufficiently to register the lugs and the between-lug spaces 152d if they are originally out of line. The lugs are of such arrangement and number that no matter where the head and bushing first engage, it will require only slight relative rotation to bring about full registration of lugs and between-lug spaces.

Preferably, split spacing collars 156, having square holes to take kelly 14, are arranged on the kelly between driving bushing 146 and the underside of Kelly bushing 12. The sections 156a of each spacing collar are bolted together at 158 to hold them in assembly about the kelly. The collars 156 are supplied in a variety of thicknesses, so a selected number may be combined to make up an overall spacing element which will reach from bushing 146 to bushing 12 in any given installation. The combined spacers act to add the weight of Kelly bushing 12 as well as their own weight, to the weight of bushing 146, to insure sufficient force to cam-rotate bushing 146 to bring lugs 152 into registry with the spaces between lugs 154 if they are out of line when the bushing 146 first engages head 138. Spacers 156 also act to transmit upward force from bushing 146 to bushing 12 when the kelly is lifted sufficiently to unseat bushing 146 from head 138, as will be described, thus causing coincident elevation of Kelly bushing 12 and freeing it from master bushing 11.

Reference is now made to Figs. 12 and 13 in which a modification of the invention is illustrated to include an inner stripper sleeve 67 that is rotatable as before, and an outer sleeve 260, running clearance between the two sleeves being indicated at 261. The outer sleeve has an enlargement 262 forming an outwardly and downwardly tapered annular shoulder 263 against which the sealing member S is radially inwardly constrictable to seal off thereagainst, as described in connection with Figs. 2 and 3. The force of constriction also includes an axial component tending to displace bodily downwardly and axially the outer sleeve 260. Downward bodily displacement of that sleeve in response to downloading is accommodated by the slip fit of the upper end portion of the sleeve within the counterbore 264 in body portion 62.

The closure means generally indicated at 265 for sealing off entrance of well fluid into the clearance 261 will now be described, it being first pointed out that the lower end of the stationary outer sleeve 260 and parts associated with the rotating inner sleeve 67 form a clearance terminus or zone of restricted clearance generally indicated at 266. The closure means includes an annular thrust bearing 267, typically made of bronze or other suitable bearing material, having an upper counterbore 268 receiving the terminal lower end 269 of outer sleeve 260, with a running fit therebetween. Upwardly tightly received within a lower counterbore 270 in the thrust bearing is the upper enlarged end portion 271 of an axially floating annulus 272. The latter is interlocked with the split ring 106 therebelow as by interfitting vertical lugs 273 on the annulus and ring better seen in Fig. 13, with the result that floating annulus 272 and the thrust bearing are constrained to rotate with inner tube 67 relative to the outer sleeve 260. As before, rotary and non-rotary parts of the modified seal are respectively designated by the letters "R" and "S."

Well pressure in space 275 exerted upwardly against annular external taper 276 on the floating annulus 272 tends to lift the annulus and thrust bearing in opposition to down-loading exerted by the packer S against the outer sleeve 260. As a result, equal and opposite pressure is exerted by interengaged and relatively rotatable thrust faces 277 and 278 on the lower end of sleeve 260 and on the bearing 267, whereby grease 279 in space 280 is prevented from escaping through the clearance terminus 266, the thrust bearing effectively blocking egress therethrough.

Bridging the thrust bearing and the lower end portion of the outer sleeve 262, and forming therewith the confined annular space 280 outside the terminus 266 is an annular piston 281 coaxial with the bearing 267, sleeves and annulus 272, all of which are centered about the common axis 282. The piston has a head 283 shouldered by the sleeve 260 at 284 and a skirt 285 which extends downwardly bridging the bearing 267. Since piston 281 may at times rotate and at other times remain nonrotating, it is labeled with both letters "R" and "S."

Downward displacement of the piston as by well fluid pressure exertion on the top of head 283 equally pressurizes the heavy viscous grease 179 in space 280 to prevent entrance of well fluid into that space. Rubber O-rings 286 and 287 received in grooves 288 and 289 in the piston head and thrust bearing, as shown, effectively seal off between the piston and bearing and the piston and sleeve 260. Since the pressure both inside and outside space 280 is equalized, the rubber O-rings are not subjected to pressure differentials that would otherwise force abrasive well fluid between rubbing rubber and metal interfaces.

In the Fig. 12 embodiment of the invention, the bulk of space 280 is located above the bearing so that piston travel downward will not be interrupted by the bearing until the great bulk of grease 279 in that space has slowly escaped between faces 277 and 278 into clearance 261. Since such leakage is very slow, the seal need be repacked, as through the threaded opening 292 closed by fitting 293, only at extended time intervals.

Shown at 294 is a rubber O-ring in an annular groove 295 cut in tube 67, the O-ring sealing off between tube 67 and the floating annulus 272 to prevent passage therebetween of abrasive oil well fluid that would otherwise enter clearance 261 from between the annulus and inner tube.

Coming now to the embodiment illustrated in Figs. 14 through 17, an inner tube 300, supports the stripper packer P in the manner previously described in connection with Figs. 1 through 3. Tube 300 is in turn supported for rotation in the bore 301 of housing 302 by structure blocking the bore, including a ball bearing ring 303 having an inner race seating tube flange 304, and an annular body 305 seating the ball bearing outer race at counterbore shoulder 306. Two additional ball bearing rings 307 center the inner tube 300 in body counterbore 308 for rotation, a cap 309 bolted to the body holding bearing rings 307 in place. Rotation about central axis 310 is transmitted to the tube 300 and packer P from a kelly, not shown, through a Kelly drive bushing generally indicated at 311, and a driving head 312 receiving the bushing, the head 312 having a shoulder 313 frictionally locked to the upper end of tube 300 by tightening bolts 314 acting on ring 315 to draw spacer 316 upwardly gripping an under shoulder 317 of the tube 300.

The structure blocking the housing bore also includes annular elastomer seals 320 and 321 packing off respectively between the rotatable inner tube 300 and body 305 and between the housing and an annular downward extension 322 of the body 305. Seals 321 are of the chevron type so as to be energizable by the pressure of well fluid passing upwardly between body taper 323 seated on housing shoulder 324a, thereby sealing off between the body and housing. On the other hand, seal 320 is always energized by an annular spring 325 so as to prevent contact of grease lubricating ball bearing 303 by a suitable coolant such as water flowing within a port 326 in the body 305 directly below the seal 320, the coolant having entered the port through openings 327 and 328 in seal back-up ring 329 and housing 302. In addition, grease may be charged periodically through a fitting 390 into space 391 below seal 320 and above an annular metal flange 392 on body 305 fitting closely around tube 300, thereby to further preclude contamination of the bearing grease by the coolant.

Attached to the underside of body 305 as by bolts 393 is the flange 394 of a second tube or sleeve 324 that coaxially surrounds inner tube 300 and forms running clearance 395 therewith, a suitable O-ring 396 sealing off between the outer sleeve 324 and body 305.

The closure means generally indicated at 330 for preventing migration of well fluid into clearance 395 through clearance terminus 331 at the lower end of outer tube 324 will now be described. Said means includes an annular thrust bearing 332, typically made of bronze or other bearing material having a lower counterbore 333 tightly receiving the upper end portion 334 of an axially floating annulus 335 that is rotatable with inner tube 300. The latter annulus is thrust upwardly to carry the bearing upper face 336 into pressure sealing engagement with the lower end face 337 of stationary outer tube 324, a series of circularly spaced compression springs 338 serving this purpose. The springs are backed up by ring 340 and extend through openings 341 in a second ring 342. The latter and ring 340 are clamped by circularly arranged bolts 343 against the horizontal upper and tapered lower annular surfaces of a split mounting ring 344 received in a groove 345 in tube 300. This clamping pressure contracts ring 344 to engage and lock frictionally to the tube and also interlocks the rings to rotate with the tube. Drive from the latter is thus transmitted to the floating annulus through a splined interlock indicated at 346 between the annulus and ring 342. Heat generated by rubbing of the faces 336 and 337 is carried away by the coolant circulated from port 326 to clearances 395 and 331a adjacent those faces.

Bridging the thrust bearing 332, ring 340 and the lower end portion 347 of outer tube 324 and forming therewith a confined annular space 348 is an annular piston 349 having a head 350 and a skirt 351. The piston is free to float axially vertically and is responsive to well fluid pressure downward exertion on the piston head to pressurize grease 352 in the space 348 so as to prevent entrance of abrasive well fluid into that space. Rubber O-rings 353 and 354 received in grooves 355 and 356 in the piston head and in ring 340, as shown, respectively seal off between the piston and outer sleeve 324, and between the piston and ring 340, and since the pressure both inside and outside space 348 is equal, the rubber O-rings and particularly ring 354 are not subjected to pressure differentials that otherwise would force abrasive well fluid between rubbing rubber and metal interfaces. O-ring 356b seals off between ring 340 and the inner tube 300.

The piston skirt is splined lengthwise at 355a for interlocking engagement with diametrically opposite splines 356a on the downward extension 357 of body 305, preventing piston rotation about central axis 310, but accommodating upward lengthwise bodily displacement of the piston skirt to expose the O-ring 354 for replacement. Such piston displacement is normally prevented by a ring 358 interposed between the extension 357 and a flange 359 on the piston skirt. However, the ring 358 is capable of rotation about axis 310 to bring a pair of ring notches 360 into underlying relation with the splines 356, thereby permitting sufficient upward displacement of the ring and piston to expose the O-ring 354. As before, grease may be conveniently packed into space 348 through a threaded fitting 362 removable from a threaded opening in the piston skirt. Also, an O-ring 363 seals off between the annulus 335 and inner tube 300 to prevent entrance of grease from space 348 into clearance 395 from between the floating annulus 335 and the inner tube.

Figure 14:
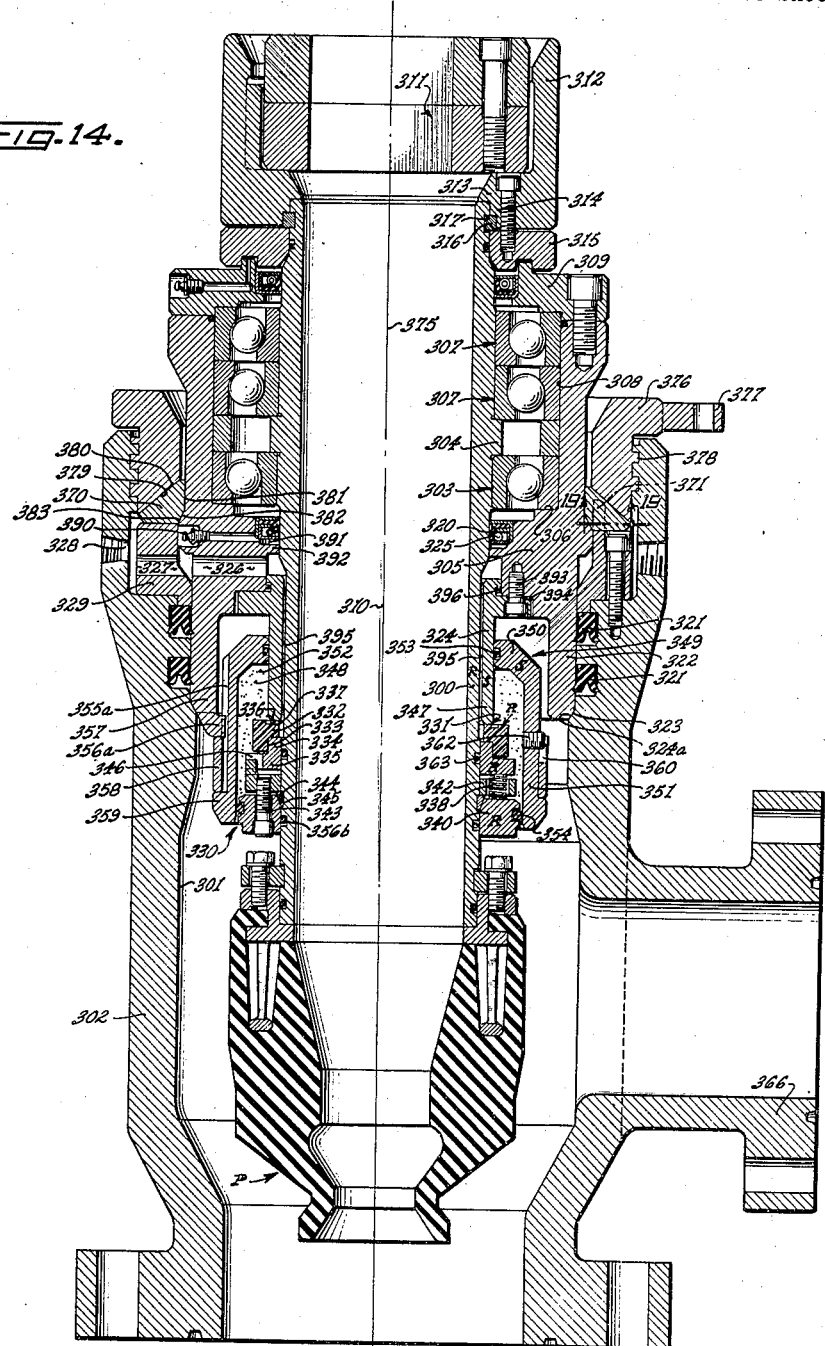
Fig. 14 is an enlarged vertical section similar to Fig. 3, showing a modified Kelly packer and housing assembly, and illustrating another modified rotatable well pressure seal.

In the Fig. 14 embodiment, the housing 302 incorporates an integral flow fitting 366, as distinguished from a separate fitting and housing as exemplified in Figs. 1 and 2.

Figure 19:
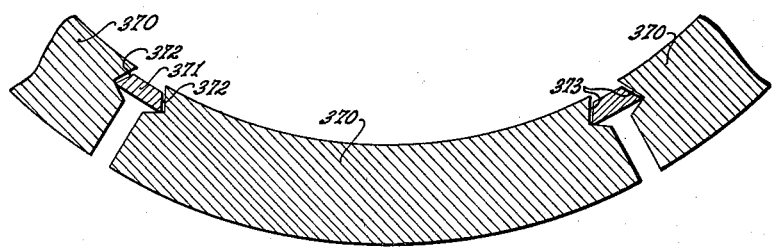
Fig. 19 is an enlarged section taken on line 19—19 of Fig. 14.

As shown in Fig. 14, the annular body 305 blocking the bore 301 of housing 302 is held in engagement with the housing shoulder 304 and also centered within the bore 301 by a number of ring segments 370 also shown in Fig. 19. The segments 370 are circularly separated by upright projections 371 from ring 329, the latter projections having trapezoidal horizontal cross sections circularly opposite sides 372 of which fit loosely into V-grooves 373 in circularly opposite ends of the segments, thereby limiting inward and outward radial displacement thereof. Also, the segments are seated on the horizontally flat top surface of ring 329.

Simultaneous radially inward displacement of the segments toward central axis 375 and into centering engagement with the outside of annular body 305, is accomplished by rotating a large annular nut insert 376 into the upwardly open end of housing 302, as by turning arm 377 about axis 375. Insert 376 has external threads engaging housing internal threads at 378, and has an annular, upwardly and inwardly tapered lower end 379 engageable with the correspondingly upwardly and inwardly tapered upper sides 380 of segments 370, such engagement acting to displace the segments inwardly the slight amount needed to center body 305 by interengagement of segment inner sides 381 with the outside of body 305. In addition, interengagement of segment internal tapers 382 with the tapered annual body shoulder 383 locks body 305 against axially endwise withdrawal from the housing 302.

Figure 20:
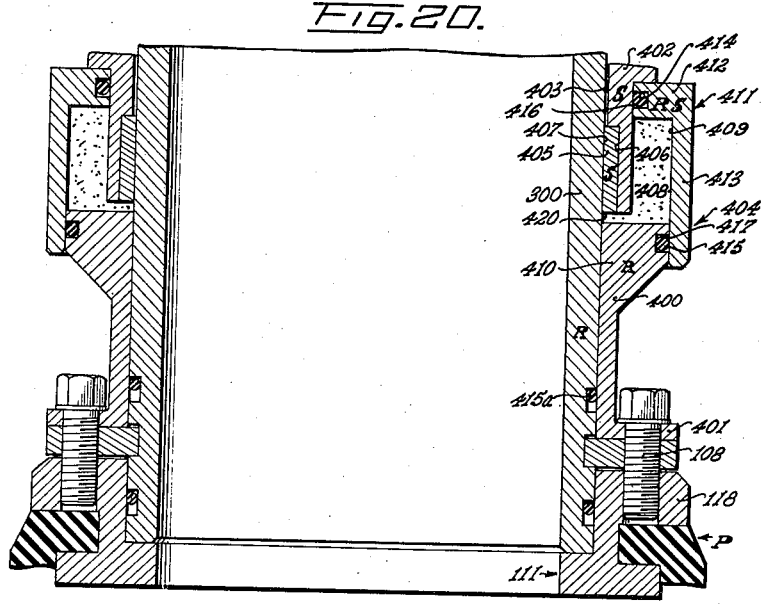
Fig. 20 is a vertical section illustrating still another modified rotatable well pressure seal.

Referring to the final embodiment illustrated in Fig. 20, the inner tube 300 supports the stripper packer P as previously described, with the exception that an annular sleeve 400 extending about the inner tube has a flanged lower end 401 connected with flange 118 of ring 111 by bolts 108. Tube 300 is supported for rotation as described in connection with Fig. 14, and an outer tube 402, corresponding with tube 324 in Fig. 14, coaxially surrounds the inner tube and forms running clearance 403 therewith.

The closure means generally indicated at 404 for sealing off entrance of well fluid into clearance 402 includes an annular bearing sleeve or bushing 405 pressed into the counterbore 406 formed in the terminal end of outer tube 403, the bearing comprising bronze or some other suitable material. The bearing has a close running fit with the periphery of the inner tube at 407, and it will be understood that alternatively the bearing may be attached to the inner tube and have a close running fit with the outer tube counterbore 406. In any event, the bearing bridges the inner and outer tubes 300 and 402, and prevents grease 408, within space 409, from passing through the zone of restricted clearance or terminus 420 into the clearance 403. Space 409 is formed by the two tubes 300 and 402, the bearing 405, the flanged upper end 410 of sleeve 400 and floating piston 411 having a head 412 and a skirt 413. The piston is free to float axially vertically, and is responsive to well fluid pressure downward exertion on the piston head to pressurize grease 408 in space 409, so as to prevent entrance of abrasive well fluid into that space.

Rubber O-rings 414 and 415 received in grooves 416 and 417 in the piston head and the flange 410 of sleeve 400 respectively seal off between the piston and the outer tube, and between the piston and the flange 410, and since the pressure both inside and outside space 409 is equalized, the rubber O-rings are not subjected to pressure differentials that otherwise would force abrasive well fluid between rubbing rubber and metal interfaces. Since the piston is free to rotate or not rotate with the inner tube, it is labelled with both letters "R" and "S." An additional O-ring 415a seals off between the sleeve 400 and inner tube 300.

The grease designated at 211 in Fig. 6, 279 in Fig. 12, 352 in Fig. 15 and 408 in Fig. 20 is preferably a viscous semi-solid or lubricant having a high melting or dropping point and preferably but not necessarily has a low mineral oil or petroleum fraction. One particular semi-solid or grease-like composition that is entirely adequate in the above respect maintains a stable, very viscous nature through a temperature range of −40° F. up to 550° F., has a Cleveland open cup flash point of 520° F., and has the following approximate composition:

| | | |
|---|---|---|
| Mineral oil | | None |
| Fatty acids | percent | 56 |
| Synthetic resins | do | 11 |
| Metallic soaps | do | 7 |
| Synthetic wax | do | 10 |
| Mineral matter | do | 10 |

Other non-melting greases or lubricants capable of retention in the grease spaces described above under high temperature conditions are the commercial lubricants known as Desco 750, a product of the Delta Engineering Sales Co., Shreveport, Louisiana, and Nordstrom No. 555, a product of the Rockwell Manufacturing Co., Pittsburgh, Pennsylvania.

I claim:
1. The combination, comprising means to contain fluid pressure including inner and outer relatively movable parts having a zone of restricted clearance therebetween, closure means in pressure sealing engagement with said parts, said parts and closure means forming a confined space communicating with the entrance to said zone for receiving a barrier liquid, and said closure means including a floating piston for transmitting said fluid pressure to barrier liquid in said space pressurizing said liquid to prevent entrance of said fluid into said space whereby migration of said fluid through said space to said clearance is prevented.

2. The combination, comprising means to contain fluid pressure including inner and outer relatively rotatable parts having a zone of restricted clearance therebetween, said parts being coaxially relatively rotatable, closure means in pressure sealing engagement with said parts, said parts and closure means forming a confined space communicating with the entrance to said zone for receiving a barrier liquid, said closure means including bearing means between said parts and adjacent said clearance, and said closure means including a floating piston for transmitting said fluid pressure to barrier liquid in said space pressurizing said liquid to prevent entrance of said fluid into said space whereby migration of said fluid through said space to said clearance is prevented.

3. The combination, comprising tubular means including inner and outer well tool tubes having clearance therebetween, said tubes being coaxially relatively rotatable, closure means in pressure sealing engagement with said tubes, said tubular and closure means forming a comfined space outside said clearance for receiving a barrier liquid, said closure means including a thrust bearing in pressure sealing engagement with said tubular means blocking egress from said space to said clearance through a restricted clearance terminus adjacent said bearing, said bearing and tubular means having interengaged relatively rotatable shoulders for transmitting thrust acting to seal off said clearance terminus, and said closure means including a floating piston exposed to the interior and exterior of said space for transmitting exterior fluid pressure to liquid in said space pressurizing said liquid to prevent entrance of said fluid into said space whereby migration of said fluid through said space to said clearance is prevented.

4. The combination, comprising tubular means including inner and outer well tool tubes having clearance therebetween, said tubes being coaxially relatively rotatable, closure means in pressure sealing engagement with said tubes, said tubular and closure means forming a confined space outside said clearance, a viscous barrier liquid in said space, said closure means including bearing means in pressure sealing engagement with said tubular means blocking egress from said space to said clearance through a restricted clearance terminus adjacent said bearing, and said closure means including a floating piston exposed to the interior and exterior of said space for transmitting exterior fluid pressure to liquid in said space equally pressurizing said liquid to prevent entrance of said fluid into said space whereby migration of said fluid through space to said clearance is prevented.

5. The combination, comprising tubular means including inner and outer well tool tubes having clearance therebetween, said tubes being coaxially relatively rotatable, closure means in pressure sealing engagement with said tubes, said tubular and closure means forming a confined space outside said clearance for receiving a barrier liquid, said closure means including an axially floating annulus closely surrounding one of said tubes, said closure means including a thrust bearing in pressure sealing engagement with said annulus and the other of said tubes blocking egrees from said space to said clearance through a restricted clearance terminus adjacent said bearing, and said closure means including a floating piston exposed to the interior and exterior of said space for transmitting exterior fluid pressure to liquid in said space pressurizing said liquid to prevent entrance of said fluid into said space whereby migration of said fluid through said space to said clearance is prevented.

6. The combination, comprising tubular means including inner and outer well tool tubes having clearance therebetween, said tubes being coaxially relatively rotatable, closure means bridging said tubes and in pressure sealing engagement therewith, said tubular and closure means forming a confined space outside said clearance for receiving a barrier liquid, said closure means including an axially floating annulus closely surrounding one of said tubes, said closure means including a thrust bearing in pressure sealing engagement with said annulus and the other of said tubes blocking egress from said space to said clearance through a restricted clearance terminus adjacent said bearing, said bearing and tubular means having interengaged relatively rotatable shoulders for transmitting thrust acting to seal off said clearance terminus, and said closure means including a floating piston exposed to the interior and exterior of said space for transmitting exterior fluid pressure to liquid in said space pressurizing said liquid to prevent entrance of said fluid into said space whereby migration of said fluid through said space to said clearance is prevented.

7. The combination, comprising tubular means including inner and outer well tool tubes having clearance therebetween, said tubes being coaxially relatively rotatable, closure means bridging said tubes and in pressure sealing engagement therewith, said tubular and closure means forming a confined space outside said clearance for receiving a barrier liquid, said closure means including an axially floating annulus closely surrounding one of said tubes, said closure means including a thrust bearing in pressure sealing engagement with said annulus and the other of said tubes blocking egress from said space to said clearance terminus adjacent said bearing, said bearing and annulus having interengaged relatively rotatable shoulders for transmitting thrust acting to seal off said clearance terminus, and said closure means including a floating piston exposed to the interior and exterior of said space for transmitting exterior fluid pressure to liquid in said space pressurizing said liquid to prevent entrance of said fluid into said space whereby migration of said fluid through said space to said clearance is prevented.

8. The combination, comprising tubular means including inner and outer well tool tubes having clearance therebetween, said tubes being coaxially relatively rotatable, closure means bridging said tubes and in pressure sealing engagement therewith, said tubular and closure means forming a confined space outside said clearance for receiving a barrier liquid, said closure means including an axially floating annulus closely surrounding one of said tubes, said closure means including a thrust bearing in pressure sealing engagement with said annulus and the other of said tubes blocking egress from said space to said clearance through a restricted clearance terminus adjacent said bearing, spring means transmitting thrust axially to said bearing through said annulus, and said closure means including a floating piston exposed to the interior and exterior of said space for transmitting exterior fluid pressure to liquid in said space pressurizing said liquid to prevent entrance of said fluid into said space whereby migration of said fluid through said space to said clearance is prevented.

9. The combination, comprising tubular means including inner and outer well tool tubes having clearance therebetween, said tubes being coaxially relatively rotatable, closure means extending annularly about and bridging said tubes and in pressure sealing engagement therewith, said tubular and closure means forming a confined annular space outside said clearance for receiving a barrier liquid filling said space, said closure means including bearing means in pressure sealing engagement with said tubular means blocking egress from said space to said clearance through a restricted clearance terminus adjacent said bearing, and said closure means including a floating annular piston exposed to the interior and exterior of said space for transmitting exterior fluid pressure to liquid in said space equally pressurizing said liquid to prevent entrance of said fluid into said space whereby migration of said fluid through said space to said clearance is prevented.

10. The invention as defined in claim 9 in which said closure means includes an axially floating annulus closely surrounding the inner tube, and in which said bearing means comprises an annular thrust bearing in pressure sealing engagement with said annulus and the outer tube.

11. The invention as defined in claim 10 including compression springs within said space transmitting thrust through said annulus to said bearing.

12. The invention as defined in claim 11 including a ring carried by said inner tube and in which said springs are held in compression between said annulus and ring.

13. The invention as defined in claim 12 in which said thrust bearing is carried by said annulus and said bearing and outer tube have interengaged relatively rotatable shoulders for transmitting thrust acting to seal off said clearance terminus.

14. The invention as defined in claim 12 in which said thrust bearing is carried by said outer tube and said bearing and annulus have interengaged relatively rotatable shoulders for transmitting thrust acting to seal off said clearance terminus.

15. The invention as defined in claim 12 including means interconnecting said ring and annulus holding them against relative rotation.

16. The invention as defined in claim 10 in which said thrust bearing engages the end of the outer tube.

17. The invention as defined in claim 16 in which said annulus is exposed to the exterior for receiving application of fluid pressure operable to thrust said annulus axially toward the bearing and said outer tube.

18. The invention as defined in claim 10 in which said closure means includes an outer sleeve bridging said thrust bearing and exposed to the interior and exterior of said space.

19. The invention as defined in claim 18 in which said thrust bearing is exposed to the interior and exterior of said space and said bearing and sleeve are relatively movable, and including an annular seal between said sleeve and bearing.

20. The invention as defined in claim 18 in which said piston and sleeve are relatively movable, and including an annular seal therebetween.

21. The invention as defined in claim 10 in which said piston has a skirt extending about said bearing, said thrust bearing is exposed to the interior and exterior of said space and said bearing and sleeve are relatively movable, and including an annular seal between said sleeve and bearing.

22. The invention as defined in claim 19 including means detachably holding said sleeve against axial displacement relative to said bearing, said detachable means being releasable to permit sufficient sleeve axial displacement to expose said bearing for replacement of said annular seal.

23. The invention as defined in claim 9 in which said bearing means extends between said inner and outer tubes.

24. The invention as defined in claim 23 in which said outer tube contains a counterbore, and in which said bearing means comprises a sleeve extending in said counterbore.

25. The invention as defined in claim 23 in which said closure means includes an annulus in pressure sealing engagement with the inner tube, said piston has a skirt extending about said annulus, and including an annular seal between said annulus and piston skirt.

26. The combination, comprising a housing having an axial bore into which pressurized well fluid is receivable, tubular means including inner and outer well tubes inserted axially into and terminating within said bore for receiving work extending axially through the tubes, said tubes having clearance therebetween, said inner tube being axially rotatable with said work relative to said outer tube, closure means in pressure sealing engagement with said tubes, said tubular and closure means forming a confined space outside said clearance for receiving a barrier liquid, said closure means including bearing means in pressure sealing engagement with said tubular means blocking egress from said space to said clearance through a restricted clearance terminus adjacent said bearing, said closure means including a floating piston exposed to the interior and exterior of said space for transmitting well fluid pressure to said liquid in said space pressurizing said liquid to prevent entrance of well fluid into said space whereby migration of said fluid through said space to said clearance is prevented, and means blocking said bore between said outer tube and said housing.

27. The combination, comprising a housing having an axial bore into which pressurized well fluid is receivable, tubular means including inner and outer well tool tubes inserted axially into and terminating within said bore for receiving work extending axially through the tubes, said tubes having clearance therebetween, said inner tube being axially rotatable with the work relative to said outer tube, closure means extending annularly about and bridging said tubes and in pressure sealing engagement therewith, said tubular and closure means forming a confined annular space outside said clearance for receiving a barrier liquid filling said space, said closure means including an axially floating annulus surrounding said tubular means in pressure sealing engagement with the inner tube, said closure means including an annular thrust bearing in pressure sealing engagement with said annulus and the outer tube blocking egress from said space to said clearance through a restricted clearance terminus adjacent said bearing, said closure means including an annular piston exposed to the interior and exterior of said space for transmitting well fluid pressure to said liquid in said space pressurizing said liquid to prevent entrance of said fluid into said space whereby migration of said fluid through said space to said clearance is prevented, and means blocking said bore between said outer tube and said housing.

28. The invention as defined in claim 27 in which said last named means includes an annular packing extending about said outer tube in the housing and means for radially constricting said annular packing into pressural engagement with said outer tube for sealing off thereagainst.

29. The invention as defined in claim 27 including an annular packing extending coaxially with and beyond the terminal end portion of said inner tube and radially constrictable inwardly against said string extending therethrough, and means attaching said packing to said inner tube terminal end portion.

30. The invention is defined in claim 27 in which said means blocking the housing bore is supported by said housing and includes anti-friction bearings supporting said inner tube for rotation in said bore.

31. The invention as defined in claim 30 in which said blocking means includes an annular body having a port communicating with the exterior outside said housing and said clearance and through which port and clearance a coolant is flowable from outside the housing to said thrust bearing.

32. The invention as defined in claim 31 in which said blocking means includes annular packing sealing off between the body and housing bore wall.

33. The invention as defined in claim 30 in which said means blocking the housing bore includes an annular body supporting said bearings, and including means centering said body in the housing bore and blocking said body against axially endwise removal therefrom.

34. The invention as defined in claim 33 in which said centering and blocking means includes a plurality of independently movable ring segments circularly spaced about said bore axis within the housing, and means engaging said housing and urging said ring segments toward said axis into pressural engagement with the periphery of said body.

35. The invention as defined in claim 34 in which said means urging the ring segments comprises an annulus in threaded engagement with the housing, said annulus acting to wedge said segments toward the body periphery.

36. The invention as defined in claim 34 in which said segments and body have tapered interengaged shoulders acting to block axially endwise removal of said body from said housing.

No references cited.